US012699739B2

(12) United States Patent
Wu et al.

(10) Patent No.: US 12,699,739 B2
(45) Date of Patent: Aug. 4, 2026

(54) LEIDEN-REFINE OPTIMIZATION ALGORITHM BASED ON UNION-FIND ALGORITHM

(71) Applicant: Beijing Zitiao Network Technology Co., Ltd., Beijing (CN)

(72) Inventors: Xing Wu, Beijing (CN); Qiang Yan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/236,621

(22) Filed: Jun. 12, 2025

(65) Prior Publication Data

US 2025/0384085 A1      Dec. 18, 2025

Related U.S. Application Data

(63) Continuation of application No. PCT/CN2024/099243, filed on Jun. 14, 2024.

(51) Int. Cl.
| | |
|---|---|
| *G06F 17/00* | (2019.01) |
| *G06F 16/901* | (2019.01) |
| *G06Q 10/40* | (2026.01) |

(52) U.S. Cl.
CPC ......... *G06F 16/9024* (2019.01); *G06Q 10/40* (2026.01)

(58) Field of Classification Search
CPC ... G06F 16/9024; G06F 16/906; G06Q 10/40; G06Q 10/42; G06Q 10/48; G06N 20/00
See application file for complete search history.

(56) References Cited

U.S. PATENT DOCUMENTS

| | | | | |
|---|---|---|---|---|
| 7,523,117 B2 * | 4/2009 | Zhang | ................. | G06F 18/2323 |
| 11,281,657 B2 * | 3/2022 | Goyal | ................. | G06F 16/2365 |
| 11,847,540 B2 * | 12/2023 | Harris | .................... | G06N 20/00 |

(Continued)

FOREIGN PATENT DOCUMENTS

| | | |
|---|---|---|
| CN | 111028092 A | 4/2020 |

OTHER PUBLICATIONS

Blondel et al., "Fast unfolding of communities in large networks," CoRR, arXiv:0803.0476v2, submitted on Mar. 2008, 12 pages.

(Continued)

*Primary Examiner* — Greta L Robinson
(74) *Attorney, Agent, or Firm* — Fish & Richardson P.C.

(57) ABSTRACT

A computer-implemented method includes: receiving data encoding an input graph comprising a group of nodes and a group of edges each connecting two nodes from the group of nodes, wherein each node represents a user on a platform with a group of users clustered into an initial set of communities; partitioning the input graph into a set of subgraphs each comprising more than one partitioned community of users; processing each subgraph using a Union-Find algorithm to generate a processed subgraph showing a revised community with a intra-community connectivity metric higher than the more than one partitioned community of users; processing each processed subgraph to split the revised community into a set of fine-grained communities; and merging the set of fine-grained communities to construct an output graph showing the plurality of users clustered into a new set of communities.

20 Claims, 3 Drawing Sheets

(56) References Cited

U.S. PATENT DOCUMENTS

2013/0124488 A1 * 5/2013 Kang ................. G06F 16/2458
707/693
2023/0126888 A1 * 4/2023 Coudert ................. G06F 9/524
714/37

OTHER PUBLICATIONS

De Silva et al., "Genetic Algorithm with a Novel Leiden-based Mutation Operator for Community Detection," In Proceedings of Advances in Artificial Intelligence: 35th Australasian Joint Conference (AI 2022), Dec. 5-8, 2022, Perth, Australia, 252-265.
International Search Report in International Appln. No. PCT/CN2024/099243, mailed on Dec. 2, 2024, 4 pages.
Sabu, "An Approach for Addressing Internally-Disconnected Communities in Louvain Algorithm," CoRR, arXiv:2402.11454v2, submitted on Feb. 2024, 15 pages.
Traag et al., "From Louvain to Leiden: guaranteeing well-connected communities," CoRR, arXiv:1810.08473v2, submitted on Oct. 2019, 25 pages.

* cited by examiner

LEIDEN-REFINE OPTIMIZATION ALGORITHM BASED ON UNION-FIND ALGORITHM

CROSS-REFERENCE TO RELATED APPLICATIONS

This application claims priority to PCT Application No. PCT/CN2024/099243, filed on Jun. 14, 2024, the disclosure of which is incorporated herein by reference in its entirety.

TECHNICAL FIELD

This specification generally relates to community detection on online platforms.

BACKGROUND

Online platforms such as a content sharing platform can connect its users from multiple regions, which may give rise to risk control scenarios where a user-user edge graph can be constructed for subsequent tasks related to risk control based on this graph. Examples of risk control scenarios can include detecting specific online communities engaging in malicious activities. In this context, community detection algorithms can play a pivotal role in graph computing algorithms for business risk control scenarios.

SUMMARY

In one aspect, some implementations provide computer-implemented method that includes: receiving data encoding an input graph comprising a plurality of nodes and a plurality of edges, each edge connecting two nodes from the plurality of nodes, wherein each node represents a user on an online platform with a plurality of users; partitioning the input graph into a plurality of subgraphs each comprising more than one partitioned community of users; processing each subgraph using a Union-Find algorithm to generate a processed subgraph representing a revised community with an intra-community connectivity metric higher than the more than one partitioned community of users; processing each processed subgraph to split the revised community into a plurality of fine-grained communities; and merging the plurality of fine-grained communities to construct an output graph representing the plurality of users on the online platform clustered into a set of detected communities.

The implementations may include one or more of the following features.

Processing each subgraph using a Union-Find algorithm may include: decomposing a subgraph to recast each node of the subgraph as an individual community. The computer-implemented method may further include: traversing each edge of the subgraph to merge two individual communities connected by the corresponding edge when the two individual communities are different; and organizing the merged individual communities to generate the processed subgraph. Each individual community may have a community number determined by a corresponding node. When the two individual communities are merged into a new community, the new community may have a community number determined by a smaller community number of the two individual communities. Nodes inside the processed subgraph with identical community numbers may form one community. The intra-community connectivity metric may include at least one of: a metric for density of connections, a metric for connected component, a metric for internal cohesion, and a metric for modularity contribution. The computer-implemented method may further include: in response to determining that the intra-community connectivity metric has not reached a threshold level, re-partitioning the output graph into a plurality of new subgraphs for continued processing.

In another aspect, some implementations provide one or more computer-readable storage media encoded with instructions that, when executed by one or more computers, cause the one or more computers to perform operations including: receiving data encoding an input graph comprising a plurality of nodes and a plurality of edges each connecting two nodes from the plurality of nodes, wherein each node represents a user on an online platform with a plurality of users; partitioning the input graph into a plurality of subgraphs each comprising more than one partitioned community of users; processing each subgraph using a Union-Find algorithm to generate a processed subgraph representing a revised community with an intra-community connectivity metric higher than the more than one partitioned community of users; processing each processed subgraph to split the revised community into a plurality of fine-grained communities; and merging the plurality of fine-grained communities to construct an output graph representing the plurality of users on the online platform clustered into a set of detected communities.

The implementations may include one or more of the following features.

Processing each subgraph using a Union-Find algorithm may include: decomposing a subgraph to recast each node of the subgraph as an individual community. The operations may further include: traversing each edge of the subgraph to merge two individual communities connected by the corresponding edge when the two individual communities are different; and organizing the merged individual communities to generate the processed subgraph. Each individual community may have a community number determined by a corresponding node. When the two individual communities are merged into a new community, the new community may have a community number determined by a smaller community number of the two individual communities. Nodes inside the processed subgraph with identical community numbers may form one community. The intra-community connectivity metric may include at least one of: a metric for density of connections, a metric for connected component, a metric for internal cohesion, and a metric for modularity contribution. The operations may further include: in response to determining that the intra-community connectivity metric has not reached a threshold level, re-partitioning the output graph into a plurality of new subgraphs for continued processing.

In yet another aspect, some implementations provide a computer system comprising one or more computer processors configured to perform operations including: receiving data encoding an input graph comprising a plurality of nodes and a plurality of edges each connecting two nodes from the plurality of nodes, wherein each node represents a user on an online platform with a plurality of users; partitioning the input graph into a plurality of subgraphs each comprising more than one partitioned community of users; processing each subgraph using a Union-Find algorithm to generate a processed subgraph representing a revised community with an intra-community connectivity metric higher than the more than one partitioned community of users; processing each processed subgraph to split the revised community into a plurality of fine-grained communities; and merging the plurality of fine-grained communities to construct an output graph representing the plurality of users on the online platform clustered into a set of detected communities.

The implementations may include one or more of the following features.

Processing each subgraph using a Union-Find algorithm may include: decomposing a subgraph to recast each node of the subgraph as an individual community. The operations may further include: traversing each edge of the subgraph to merge two individual communities connected by the corresponding edge when the two individual communities are different; and organizing the merged individual communities to generate the processed subgraph. Each individual community may have a community number determined by a corresponding node. When the two individual communities are merged into a new community, the new community may have a community number determined by a smaller community number of the two individual communities. Nodes inside the processed subgraph with identical community numbers may form one community. The intra-community connectivity metric may include at least one of: a metric for density of connections, a metric for connected component, a metric for internal cohesion, and a metric for modularity contribution. The operations may further include: in response to determining that the intra-community connectivity metric has not reached a threshold level, re-partitioning the output graph into a plurality of new subgraphs for continued processing.

The subject matter described in this specification can be implemented in particular embodiments so as to realize one or more of the following advantages. First, some implementations employ technical solutions unique to computerized communication networks to construct graphs for community detection with improved efficiency and accuracy. In one example, the implementations only need to traverse all the edges in the community once. In contrast, existing algorithms generally require each edge to be processed multiple times. As a result, the implementations of the present disclosure provides improved efficiency in terms of reduced computation time and memory access. In fact, the implementations can, in some instances, be expected to reduce the calculation time by three quarters ($3/4$). In another example, unlike existing algorithms that can disperse the communities to have connected nodes assigned to separate communities, the implementations can obtain fewer communities, and thus generate separate communities that are truly disconnected. In other words, the implementations can provide improved accuracy in detecting communities.

Second, the implementations are scalable to operate on large-scale online platforms that are dynamic in nature when users can join or leave and as connections are made or dissolved. Indeed, the implementations can operate in real-time for large numbers (e.g., hundreds of millions, billions, or more) of registered users. The sheer volume and speed render the computational tasks infeasible for the human mind. Moreover, the ability to process graph construction in real-time allows practical applications never before feasible on large networks including, for example, including finding malicious groups in risk control scenarios, finding groups who have the same purchasing interests in e-commerce scenario, finding potential friendship relationship on social networks by identifying contacts based on the contacts' community, providing content personalization to deliver relevant content to users based on the users' community, and spam/fraud detection by identifying anomalies in community structures. The details of one or more implementations of the subject matter of this specification are set forth in the description, the claims, and the accompanying drawings.

Other features, aspects, and advantages of the subject matter will become apparent from the description, the claims, and the accompanying drawings.

BRIEF DESCRIPTION OF DRAWINGS

Like reference numbers and designations in the various drawings indicate like elements.

DETAILED DESCRIPTION

Figure 1:
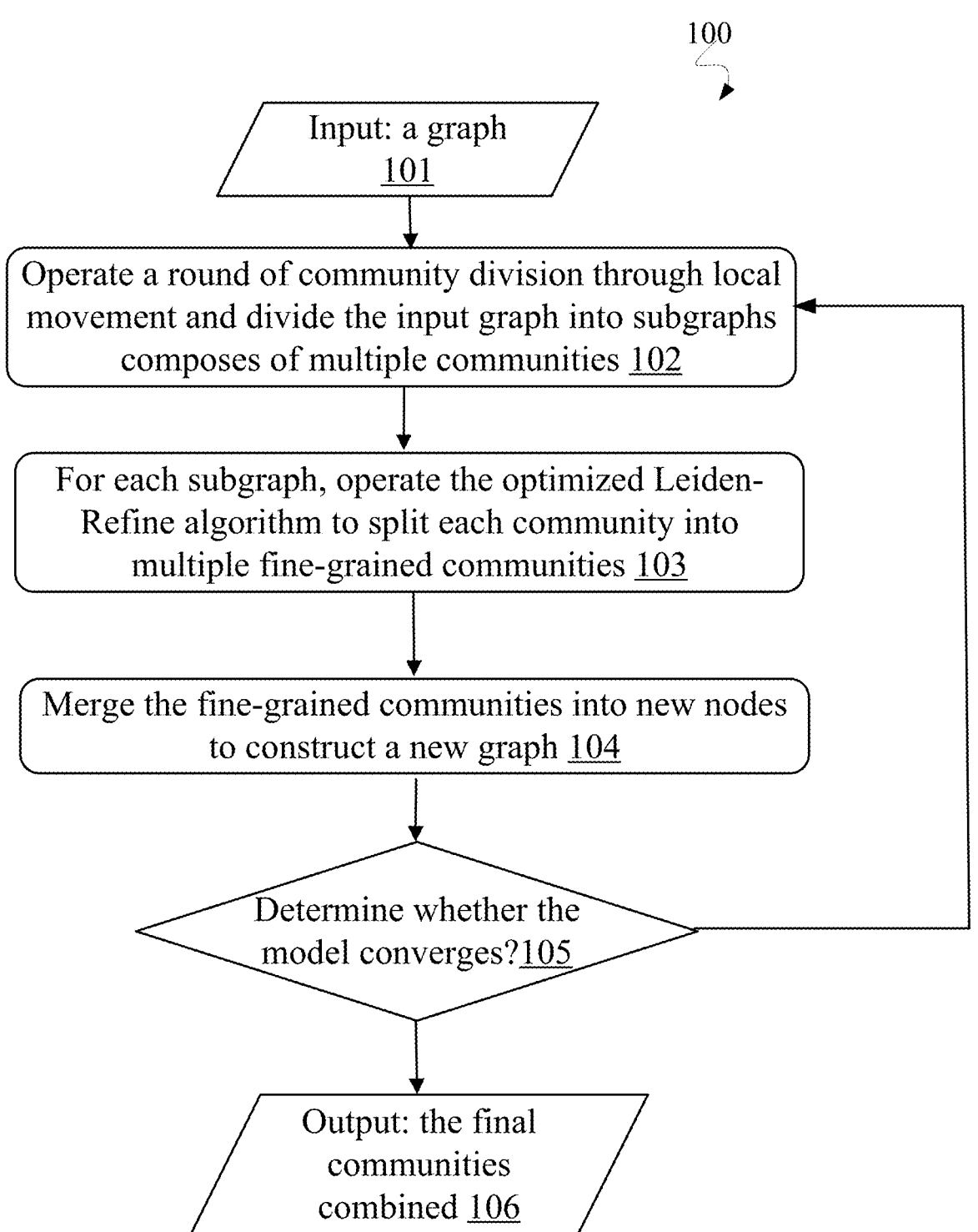
FIG. 1 illustrates an example of a workflow diagram for graph construction using a Leiden-Refine algorithm.

The disclosed technology addresses the technical challenge of weak connectivity between some nodes of a graph encountered during community detection. For example, graph computing algorithms may first perform an iteration of community division, merge the nodes divided into a community to generate a super node, re-divide the new super nodes into communities, and repeat the above steps until no new community divisions can be made. During the process of merging community nodes into super nodes, weak connectivity may be encountered, where these nodes are partitioned into a community but are not entirely connected. Existing algorithms (e.g., Leiden-Refine algorithm) have limitations in addressing the weak connectivity issue. In one example, existing algorithms include local community division, which is executed repeatedly, and the iterative computing process is time consuming. In another example, existing algorithms can cause the community to be more dispersed than before the processing, leaving nodes that should be divided into a community untouched during the division step.

The disclosed technology includes the following salient features as part of a solution to the technical challenge. These salient features improve the operation of the underlying computing and communication infrastructure. First, the implementations solve the weak connectivity problem of the community in the algorithm in a computationally more efficient manner. For example, the implementations only need to traverse all the edges in the graph once for computing the community, while in the existing algorithm, each edge may be used multiple times during the iterative process. As a result, the implementations incur less computation time and memory access. Second, unlike existing algorithms that can disperse the communities to have connected nodes assigned to separate communities, the implementations can obtain fewer communities, and thus generate separate communities that are truly disconnected.

Graph construction algorithms such as the Leiden algorithm can be used in many community detection tasks including, for example, finding malicious groups in risk control scenarios, finding groups who have the same purchasing interests in e-commerce scenario, finding potential relationships on social networks by identifying contacts based on the contacts' community, providing content personalization to deliver relevant content to users based on the users' community, or spam/fraud detection by identifying anomalies in community structures. Implementations of the present disclosure can be used in scenarios where the Leiden algorithm is suitable. The disclosed technology thus addresses the technical challenges arising from graph constructions that are unique to a modern platform digitally interconnecting an overwhelming number of registered and active users. More details of these salient features that allow for practicable applications based on implementations of the present disclosure are provided below with references to FIGS. 1 through 3.

FIG. 1 illustrates diagram 100 depicting an example of a workflow diagram for graph construction using Leiden's algorithm combined with an optimized Refine algorithm. For convenience, the process 100 will be described as being performed by a system of one or more computers, located in one or more locations, and programmed appropriately in accordance with this specification. For example, the system can include a server computer, e.g., the server computer FIG. 3, that when appropriately programmed, can perform the process 100. The system can incorporate a server computer for one of the multiple regions for which the cross-regional security graph is being constructed.

As illustrated, the system receives an input 101, which is a graph composed of nodes and edges. Each node indicates a user node, which can correspond to an active user on the platform. The edges represent connections between the users. In step 102, the system operates a round of community division through local movement of the nodes and divides the input graph into multiple subgraphs, each including one or more communities. A community refers to a group of users with strong connections suggesting shared characteristics, such as users of a common carrier, users on a common online platform (e.g., social networking, e-commerce, content-sharing), or users of a common discussion group. In some cases, the nodes are moved to neighboring communities to optimize modularity locally, but with additional checks to ensure that communities remain connected.

In the context of community detection on large scale online platforms, being "strongly connected" means that a community forms a cohesive and robust subgraph where there is a high level of connectivity among its members. Example metrics of strongly connected communities include: a high density of connections, a single connected component, a robust internal cohesion, and high modularity contribution. High-density of connections can be measured by the number of edges within the community. For instance, whether this number is high relative to the number of possible edges between any pair of nodes. When this ratio is higher than a threshold percentage, the number of edges indicates that members of the community are well interconnected. The community forms a single connected component when there is a path between any pair of nodes within the community. For instance, when each member in a community can reach every other member of the community either directly or indirectly, this indicates strong connection. A robust internal cohesion is when a community remains connected to each other even when a few connections are removed. The internal cohesion metric indicates the presence of redundancy in the connections. A high modularity contribution is when communities contribute significantly to the modularity of the network, indicating a clear separation from other communities. A modularity measure is used to quantify the quality of a division of a network into communities. Specifically, a high modularity score indicates a strong community structure, where there are dense connections between the nodes within each community but sparse connections between nodes in different communities.

This contrasts with "weak connectivity," where the connections within the community are sparse or fragmented.

Example metrics of weak connectivity include: a low density of connections (where the number of edges within the community is low relative to the number of possible edges), multiple connected components (where the group is fragmented into multiple sub-groups with no interactions with each other), a low internal cohesion (where the community can fall apart if a few connections are removed), and a low modularity contribution (where the members of the community lack intra-community and inter-community interactions).

In step 103, for each subgraph, the system runs the optimized Leiden-Refine algorithm to split each community into multiple fine-grained communities. For example, if a community is found to have disconnected sub-communities, these are split into separate fine-grained communities. In other words, communities that are not internally connected are split into smaller, connected components. The splitting can result in each community forming a single connected component, meaning each community is a cohesive unit without isolated sub-parts.

In step 104, the system merges the fine-grained communities obtained by optimized Leiden-Refine algorithm into new nodes to construct a new graph. For example, small or weakly connected communities may be merged with neighboring communities to form stronger, more cohesive communities. Small and weakly connected communities in the context of network analysis and community detection algorithms refer to groups of nodes (e.g., individuals in a social network) that either have few members (small size) or lack sufficient internal connections (weak connectivity) to form a robust and cohesive community. Examples can include sparse subgraphs in which a community has very few edges connecting its nodes. For instance, in a social network, a group of users who have only a few interactions among themselves. Examples can also include disconnected subgraphs in which parts of a community are not connected to each other at all, forming isolated subgroups. For instance, a supposed community of 150 users with two separate groups, namely, a first group of 70 and a second group of 80, with no connections between the two groups. Examples can also include bridges or single-link communities where the majority of nodes are connected through a single node or a few nodes acting as bridges. Additional examples can include string or path-like structures in which communities form linear or near-linear structures rather than cluster structures.

In step 105, the system determines whether the model has converged sufficiently. For example, the system may determine the incremental changes in the last round of iteration are within a threshold level. The system may re-evaluate the community assignments of the nodes to re-assess the modularity while maintaining connectivity. The system may also determine whether the number of rounds of iteration has reached a threshold level. In response to determining the model has not converged sufficiently, the system may continue to launch a new round of iteration of community division through local movements of nodes (102). In response to determining that the model has converged sufficiently, the system may output the communities obtained from step 104 in step 106.

Figure 2:
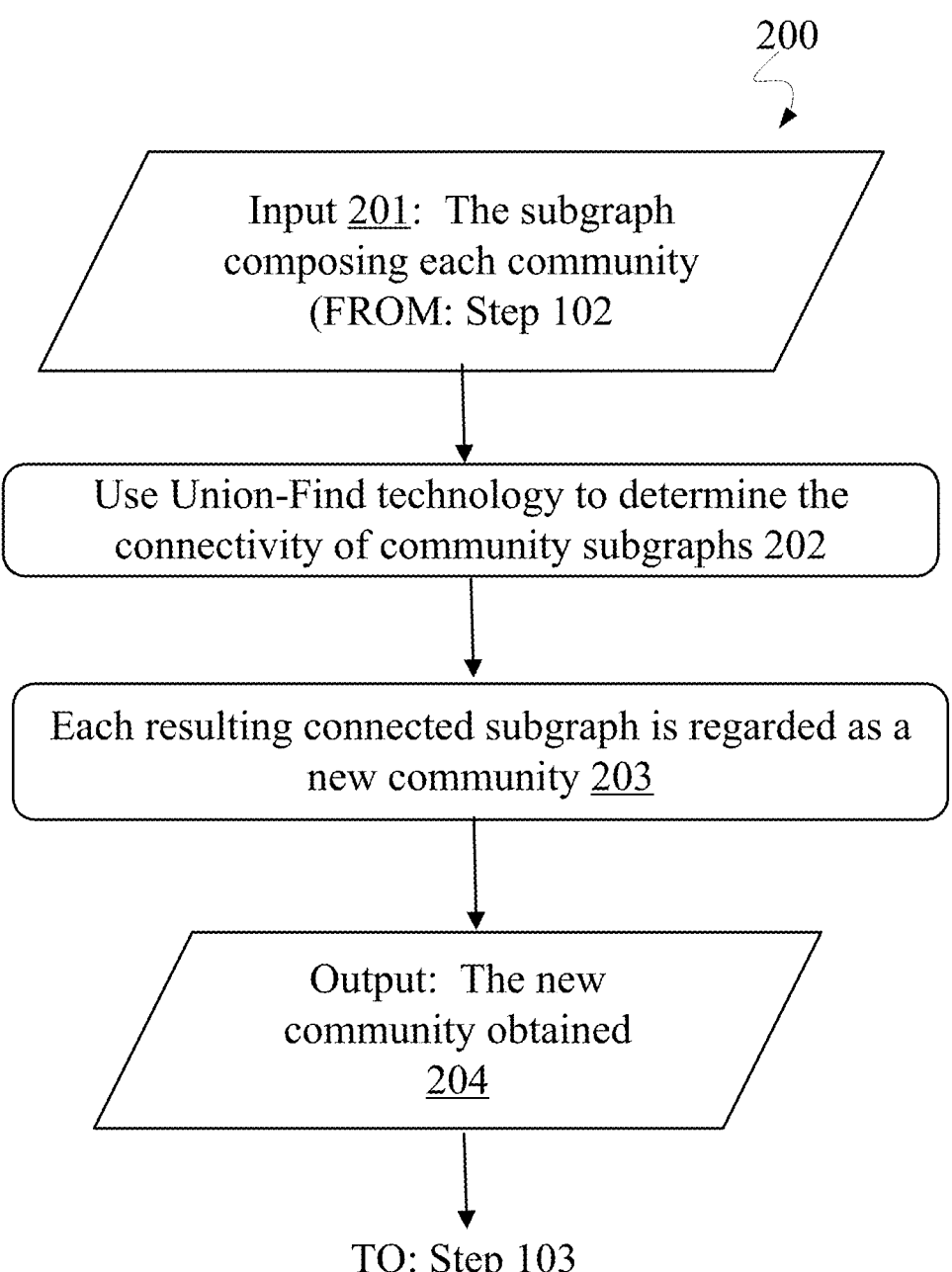
FIG. 2 illustrates an example of incorporating a Union-Find algorithm into the Leiden-Refine algorithm of FIG. 1.

FIG. 2 illustrates an example diagram 200 of incorporating a Union-Find algorithm into the optimized Leiden-Refine algorithm of FIG. 1. The system receives input 201 from step 102 of FIG. 1, which generates subgraphs composed of communities. In step 202, the system uses the Union-Find technology to determine the connectivity of community subgraphs. In step 203, the system provides a new strongly connected subgraph, which is treated as a new community. The system then outputs the new community (204) as the input of the Leiden-Refine algorithm at step 103 of FIG. 1. This subgraph constitutes a community. After the Refine stage (step 104 of FIG. 1), the community may be further divided into, for example, 3 or 4 new small communities. Given the use of the Union-Find technology, the system can generate these new small communities as strongly connected.

More specifically, the system can execute an optimized Leiden-Refine algorithm based on Union-Find algorithm as follows. First, the system breaks up the community subgraph so that each node becomes a new community with a community number of the node. The system then traverses each edge of the subgraph. When two nodes corresponding to the edge belong to different communities, the system can merge the two nodes to form a new community and update the community numbers of the two nodes to the smaller one of the two nodes. When the two nodes already belong to the same community, then no processing will be performed. After traversing all edges, nodes with the same community number will form a new community, which is the output of the optimized Leiden-Refine algorithm, which can feed step 103 of FIG. 1.

The implementations enjoy the following benefits. First, in the optimized Leiden-Refine algorithm based on the Union-Find algorithm, as used by the implementations, the system only needs to traverse all edges in the community once. In comparison, in the existing algorithms (e.g., the Leiden algorithm), for example, each edge may be traversed multiple times. Therefore, the implementations are more efficient in computation time and are expected to reduce computation time by three quarters (¾).

Second, the implementations can solve the problem of weak connection within a community by further splitting the community where the number of communities after splitting can be minimized. In comparison, in the existing algorithms (e.g., the Leiden algorithm), even if two nodes are connected, the nodes may still be assigned to two separate communities. The implementations of the present disclosure can generate fewer communities and can generate communities that are always disconnected (and without degeneracy).

Figure 3:
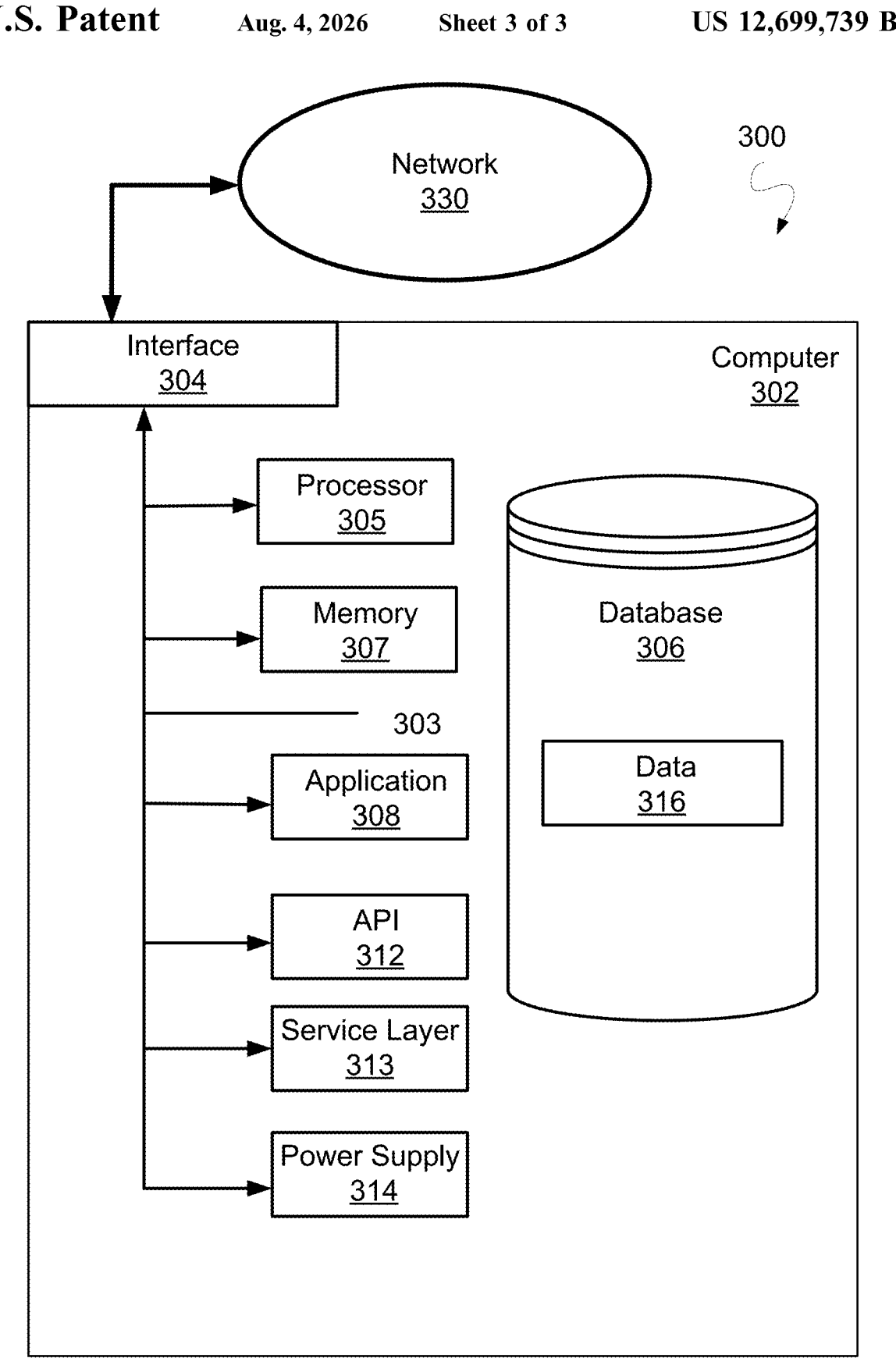
FIG. 3 is a block diagram illustrating an example of a computer system used to provide computational functionalities associated with described algorithms, methods, functions, processes, flows, and procedures, according to an implementation of the present disclosure.

FIG. 3 is a block diagram illustrating an example of a computer system 300 used to provide computational functionalities associated with described algorithms, methods, functions, processes, flows, and procedures, according to an implementation of the present disclosure. The illustrated computer 302 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 302 can comprise a computer that includes an input device, such as a keypad, keyboard, touch screen, another input device, or a combination of input devices that can accept user information, and an output device that conveys information associated with the operation of the computer 302, including digital data, visual, audio, another type of information, or a combination of types of information, on a graphical-type user interface (UI) (or GUI) or other UI.

The computer 302 can serve in a role in a computer system as a client, network component, a server, a database or another persistency, another role, or a combination of roles for performing the subject matter described in the present disclosure. The illustrated computer 302 is communicably coupled with a network 330. In some implementations, one or more components of the computer 302 can be configured to operate within an environment, including cloud-computing-based, local, global, another environment, or a combination of environments.

The computer 302 is an electronic computing device operable to receive, transmit, process, store, or manage data and information associated with the described subject matter. According to some implementations, the computer 302 can also include or be communicably coupled with a server, including an application server, e-mail server, web server, caching server, streaming data server, another server, or a combination of servers.

The computer 302 can receive requests over network 330 (for example, from a client software application executing on another computer 302) and respond to the received requests by processing the received requests using a software application or a combination of software applications. In addition, requests can also be sent to the computer 302 from internal users, external or third-parties, or other entities, individuals, systems, or computers.

Each of the components of the computer 302 can communicate using a system bus 303. In some implementations, any or all of the components of the computer 302, including hardware, software, or a combination of hardware and software, can interface over the system bus 303 using an application programming interface (API) 312, a service layer 313, or a combination of the API 312 and service layer 313. The API 312 can include specifications for routines, data structures, and object classes. The API 312 can be either computer-language independent or dependent and refer to a complete interface, a single function, or even a set of APIs. The service layer 313 provides software services to the computer 302 or other components (whether illustrated or not) that are communicably coupled to the computer 302. The functionality of the computer 302 can be accessible for all service consumers using this service layer. Software services, such as those provided by the service layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 302, alternative implementations can illustrate the API 312 or the service layer 313 as stand-alone components in relation to other components of the computer 302 or other components (whether illustrated or not) that are communicably coupled to the computer 302. Moreover, any or all parts of the API 312 or the service layer 313 can be implemented as a child or a sub-module of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302. The interface 304 is used by the computer 302 for communicating with another computing system (whether illustrated or not) that is communicatively linked to the network 330 in a distributed environment. Generally, the interface 304 is operable to communicate with the network 330 and comprises logic encoded in software, hardware, or a combination of software and hardware. More specifically, the interface 304 can comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors can be used according to particular needs, desires, or particular implementations of the computer 302. Generally, the processor 305 executes instructions and manipulates data to perform the operations of the computer 302 and any algorithms, methods, functions, processes, flows, and procedures as described in the present disclosure.

The computer 302 also includes a database 306 that can hold data for the computer 302, another component communicatively linked to the network 330 (whether illustrated or not), or a combination of the computer 302 and another component. For example, database 306 can be an in-memory, conventional, or another type of database storing data consistent with the present disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases of similar or differing types can be used according to particular needs, desires, or particular implementations of the computer 302 and the described functionality. While database 306 is illustrated as an integral component of the computer 302, in alternative implementations, database 306 can be external to the computer 302. As illustrated, the database 306 holds the previously described data 316 including, for example, data being encrypted and data received from computer servers of other regions.

The computer 302 also includes a memory 307 that can hold data for the computer 302, another component or components communicatively linked to the network 330 (whether illustrated or not), or a combination of the computer 302 and another component. Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 or similar or differing types can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in the present disclosure. For example, application 308 can serve as one or more components, modules, or applications. Further, although illustrated as a single application 308, the application 308 can be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user-or non-user-replaceable. In some implementations, the power supply 314 can include power-conversion or management circuits (including recharging, standby, or another power management functionality). In some implementations, the power-supply 314 can include a power plug to allow the computer 302 to be plugged into a wall socket or another power source to, for example, power the computer 302 or recharge a rechargeable battery.

There can be any number of computers 302 associated with, or external to, a computer system containing computer 302, each computer 302 communicating over network 330. Further, the term "client," "user," or other appropriate terminology can be used interchangeably, as appropriate, without departing from the scope of the present disclosure. Moreover, the present disclosure contemplates that many users can use one computer 302, or that one user can use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory devices. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   receiving data encoding an input graph comprising a plurality of nodes and a plurality of edges, each edge connecting two nodes from the plurality of nodes, wherein each node represents a user on an online platform with a plurality of users;
   partitioning the input graph into a plurality of subgraphs each comprising more than one partitioned community of users;
   processing each subgraph using a Union-Find algorithm to generate a processed subgraph representing a revised community with an intra-community connectivity metric higher than the more than one partitioned community of users;
   processing each processed subgraph to split the revised community into a plurality of fine-grained communities; and
   merging the plurality of fine-grained communities to construct an output graph representing the plurality of users on the online platform clustered into a set of detected communities.

2. The computer-implemented method of claim 1, wherein processing each subgraph using a Union-Find algorithm comprises:
   decomposing a subgraph to recast each node of the subgraph as an individual community.

3. The computer-implemented method of claim 2, further comprising:
   traversing each edge of the subgraph to merge two individual communities connected by the corresponding edge when the two individual communities are different; and
   organizing the merged individual communities to generate the processed subgraph.

4. The computer-implemented method of claim 3, wherein each individual community has a community number determined by a corresponding node, and
   wherein when the two individual communities are merged into a new community, the new community has a community number determined by a smaller community number of the two individual communities.

5. The computer-implemented method of claim 3, wherein nodes inside the processed subgraph with identical community numbers form one community.

6. The computer-implemented method of claim 1, wherein the intra-community connectivity metric comprises at least one of: a metric for density of connections, a metric for connected component, a metric for internal cohesion, and a metric for modularity contribution.

7. The computer-implemented method of claim 6, further comprising:
   in response to determining that the intra-community connectivity metric has not reached a threshold level, re-partitioning the output graph into a plurality of new subgraphs for continued processing.

8. One or more non-transitory, computer-readable storage media encoded with instructions that, when executed by one or more computers, cause the one or more computers to perform operations comprising:

receiving data encoding an input graph comprising a plurality of nodes and a plurality of edges each connecting two nodes from the plurality of nodes, wherein each node represents a user on an online platform with a plurality of users;

partitioning the input graph into a plurality of subgraphs each comprising more than one partitioned community of users;

processing each subgraph using a Union-Find algorithm to generate a processed subgraph representing a revised community with an intra-community connectivity metric higher than the more than one partitioned community of users;

processing each processed subgraph to split the revised community into a plurality of fine-grained communities; and merging the plurality of fine-grained communities to construct an output graph representing the plurality of users on the online platform clustered into a set of detected communities.

9. The one or more non-transitory, computer-readable storage media of claim 8, wherein processing each subgraph using a Union-Find algorithm comprises:

decomposing a subgraph to recast each node of the subgraph as an individual community.

10. The one or more non-transitory, computer-readable storage media of claim 9, wherein the operations further comprise:

traversing each edge of the subgraph to merge two individual communities connected by the corresponding edge when the two individual communities are different; and organizing the merged individual communities to generate the processed subgraph.

11. The one or more non-transitory, computer-readable storage media of claim 10, wherein each individual community has a community number determined by a corresponding node, and wherein when the two individual communities are merged into a new community, the new community has a community number determined by a smaller community number of the two individual communities.

12. The one or more non-transitory, computer-readable storage media of claim 10, wherein nodes inside the processed subgraph with identical community numbers form one community.

13. The one or more non-transitory, computer-readable storage media of claim 8, wherein the intra-community connectivity metric comprises at least one of: a metric for density of connections, a metric for connected component, a metric for internal cohesion, and a metric for modularity contribution.

14. The one or more non-transitory, computer-readable storage media of claim 13, wherein the operations further comprise:

in response to determining that the intra-community connectivity metric has not reached a threshold level, re-partitioning the output graph into a plurality of new subgraphs for continued processing.

15. A computer system comprising one or more computer processors configured to perform operations comprising:

receiving data encoding an input graph comprising a plurality of nodes and a plurality of edges each connecting two nodes from the plurality of nodes, wherein each node represents a user on an online platform with a plurality of users;

partitioning the input graph into a plurality of subgraphs each comprising more than one partitioned community of users;

processing each subgraph using a Union-Find algorithm to generate a processed subgraph representing a revised community with an intra-community connectivity metric higher than the more than one partitioned community of users;

processing each processed subgraph to split the revised community into a plurality of fine-grained communities; and merging the plurality of fine-grained communities to construct an output graph representing the plurality of users on the online platform clustered into a set of detected communities.

16. The computer system of claim 15, wherein processing each subgraph using a Union-Find algorithm comprises:

decomposing a subgraph to recast each node of the subgraph as an individual community.

17. The computer system of claim 16, wherein the operations further comprise:

traversing each edge of the subgraph to merge two individual communities connected by the corresponding edge when the two individual communities are different; and organizing the merged individual communities to generate the processed subgraph.

18. The computer system of claim 17, wherein each individual community has a community number determined by a corresponding node, and wherein when the two individual communities are merged into a new community, the new community has a community number determined by a smaller community number of the two individual communities.

19. The computer system of claim 15, wherein nodes inside the processed subgraph with identical community numbers form one community.

20. The computer system of claim 15, wherein the intra-community connectivity metric comprises at least one of: a metric for density of connections, a metric for connected component, a metric for internal cohesion, and a metric for modularity contribution, and wherein the operations further comprise: in response to determining that the intra-community connectivity metric has not reached a threshold level, re-partitioning the output graph into a plurality of new subgraphs for continued processing.

* * * * *